US012681368B2

(12) United States Patent
Kang et al.

(10) Patent No.: US 12,681,368 B2
(45) Date of Patent: Jul. 14, 2026

(54) DISASSEMBLY AND ASSEMBLY COMPONENT AND ELECTRONIC DEVICE KIT APPLYING THE SAME

(71) Applicant: TILTA INC., Burbank, CA (US)

(72) Inventors: Jiawen Kang, Shenzhen (CN);
Wenping Zeng, Shenzhen (CN);
Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 373 days.

(21) Appl. No.: 18/427,458

(22) Filed: Jan. 30, 2024

(65) Prior Publication Data

US 2025/0180971 A1     Jun. 5, 2025

(30) Foreign Application Priority Data

Dec. 5, 2023   (CN) .......................... 202323320433.9

(51) Int. Cl.
*G03B 17/56*          (2021.01)
*H04M 1/02*          (2006.01)
(52) U.S. Cl.
CPC ........ *G03B 17/566* (2013.01); *H04M 1/0274* (2013.01)
(58) Field of Classification Search
CPC ............................ G03B 17/566; H04M 1/0274
See application file for complete search history.

(56) References Cited

U.S. PATENT DOCUMENTS

| | | | | |
|---|---|---|---|---|
| 10,440,843 | B2 * | 10/2019 | Deng | .......................... F16B 2/12 |
| 11,045,913 | B1 * | 6/2021 | Wieler | ............... H05K 13/0486 |
| 12,397,485 | B2 * | 8/2025 | Tanaka | .............. B29C 45/14655 |
| 2020/0229311 | A1 * | 7/2020 | Wu | ....................... H05K 7/1487 |
| 2021/0259125 | A1 * | 8/2021 | Liao | ........................ H05K 5/069 |
| 2022/0404688 | A1 * | 12/2022 | Zhou | ...................... H04N 23/51 |
| 2024/0411212 | A1 * | 12/2024 | Zhou | .................... G03B 17/566 |
| 2025/0087937 | A1 * | 3/2025 | Huang | ................. H05K 5/0221 |
| 2025/0150694 | A1 * | 5/2025 | Li | ........................... H04N 23/55 |

* cited by examiner

*Primary Examiner* — Dhaval V Patel
(74) *Attorney, Agent, or Firm* — LOZA & LOZA, LLP; Derek W. Yeung

(57)          ABSTRACT

The present disclosure provides a disassembly and assembly component and an electronic device kit. The disassembly and assembly component includes a mounting base, a clamping component, and a trigger. The clamping component comprises the relatively arranged first clamping component and second clamping component. The trigger's one end extends into the first limiting groove and can move back and forth along the axis of the second limiting groove in the active space formed by the first and second clamping components. This movement causes the parts of the first and second clamping components located in the first limiting groove to move closer or farther apart, allowing the extending parts of the clamping parts to rotate or reset relative to the mounting base. Through the mutual approach or separation of the first clamping component and the second clamping component, convenient and quick clamping or releasing of the housing component is achieved.

12 Claims, 11 Drawing Sheets

1000

2000

3000

1400

1200

1000

1210

DISASSEMBLY AND ASSEMBLY COMPONENT AND ELECTRONIC DEVICE KIT APPLYING THE SAME

CROSS-REFERENCE TO RELATED APPLICATIONS

The present Application for patent claims priority to and the benefit of pending Chinese Application No. 2023233204339, filed Dec. 5, 2023, and hereby expressly incorporated by reference herein as if fully set forth below in its entirety and for all applicable purposes.

TECHNICAL FIELD

The present disclosure relates to the technical field of electronic device accessories, more specifically, it involves a disassembly and assembly component and electronic device kits that applies the disassembly and assembly component.

INTRODUCTION

With the widespread use of photography and videography in people's lives, an increasing number of individuals engage in daily photography. There is a growing demand for enhanced photographic and video capabilities in electronic devices. Currently available electronic devices on the market have increasingly optimized photographic functions. However, these devices typically meet only the general photography requirements of users, and their capabilities are relatively limited. When users want to use additional accessories, it becomes challenging to fulfill more diverse photography requirements or needs.

BRIEF SUMMARY

The present disclosure discloses a disassembly and assembly component and an electronic device kit that applies the disassembly and assembly component, enabling the installation of photography accessories through the disassembly and assembly components to enhance the functionality of electronic devices, meeting a broader range of photographic requirements.

Regarding the first aspect, the present disclosure provides a disassembly and assembly component, wherein comprising:

a mounting base equipped with a first limiting groove and a second limiting groove, the second limiting groove is positioned through the sidewall of the mounting base, establishing a connection with the first limiting groove;

a clamping component, comprising a first clamping component and a second clamping component arranged opposite to each other, with the first clamping component and the second clamping component are elastically (or movably) arrange within the first limiting groove, and one end of the first clamping component and the second clamping component extends from the mounting base. an active space formed between opposing surfaces of the first clamping component and second clamping components within the first limiting groove;

a trigger, a first end of the trigger is arranged within the second limiting groove, and a second end of the trigger extends towards the first limiting groove. The trigger can reciprocate along a axis of the second limiting groove within the active space. During movement in the first direction within the active space, the trigger drives one end of the first and second clamping components to move away from each other within the first limiting groove, instigating relative motion between a protruding end of the first and second clamping components relative to the mounting base. when the trigger moves in the second direction within the active space, the first clamping component and the second clamping component can reset in relation to the mounting base.

Wherein the first direction and the second direction are opposite.

In an embodiment, the mounting base comprises a first, a second, a third, and a fourth sidewalls. The first and second sidewalls are arranged opposite each other, the third sidewall and the fourth sidewall are arranged opposite each to other, the first sidewall, the second sidewall, the third sidewall and the fourth sidewall enclose to form at least a portion of the first limiting groove, while the second limiting groove is positioned through the fourth sidewall. A first resilient element is positioned between the first sidewall and the first clamping component, and a second resilient element is positioned between the second sidewall and the second clamping component. As the trigger moves along the axis of the second limiting groove towards the third sidewall, driving relative motion of the first and second clamping components in relation to the mounting base. Conversely, when the trigger moves away from the third sidewall along the axis of the second limiting groove, an elastic restoring force of the first and second resilient elements prompts the reset of the first and second clamping components in relation to the mounting base.

In an embodiment, the disassembly and assembly component incorporates an elastic body, which finds its placement between the third sidewall and the trigger.

In an embodiment, the trigger is furnished with a first abutment and a second abutment, while corresponding third and fourth abutments are located on the opposing sides of the first clamping component and the second clamping component. The first abutment aligns with the third abutment, and the second abutment aligns with the fourth abutment;

the first and second abutments are arranged as protruding structures, while the third and fourth abutments are arranged as recessed structures corresponding to the protruding structures, or conversely, the first and second abutments are arranged as recessed structures, while the third and fourth abutments are arranged as corresponding protruding structures corresponding to the recessed structures.

In an embodiment, the mounting base encompasses a first mounting base and a second mounting base. The first and second limiting grooves are situated on the first mounting base, a first end of both the first clamping component and the second clamping component resides within the first limiting groove, a second end is arranged to extend beyond the first mounting base. The second mounting base is affixable in a detachable manner to the first mounting base.

In an embodiment, a limiting pillar is introduced within the first limiting groove, complemented by a limiting hole positioned centrally within the trigger. This dynamic pairing allows the limiting pillar to move within the limiting hole, enabling the trigger's mobility along the sidewall of the limiting pillar.

In an embodiment, there are first and second sides within the mounting base. The first clamping component and the second clamping component partially protrude from the second side, which is equipped with a first positioning pillar.

Regarding the second aspect, the present disclosure provides an electronic device kit that applies the disassembly and assembly component, comprising:

a housing component featuring a containment cavity designed to house an electronic device;

a plurality of disassembly and assembly components as described above are detachably positioned on the housing component. This configuration allows for the mounting of photographic accessories onto the housing component;

In an embodiment, a control module and a connecting wire are included within the containment cavity; the sidewall of the housing component is outfitted with at least one mounting interface, and each mounting interface is equipped with at least one electronic contact point; the connecting wire extends to connect the two ends of the electronic contact points and the control module; the disassembly and assembly component, situated adjacent to one side of the housing component, is endowed with electronic contact pins; these electronic contact pins establish contact with the electronic contact points, ensuring effective circuit conductivity within the system;

According to the disassembly and assembly component in the above embodiment, including a mounting base, a clamping component, and a trigger, the clamping component comprises the relatively arranged first clamping component and second clamping component. The trigger's one end extends into the first limiting groove and can move back and forth along the axis of the second limiting groove in the active space formed by the first and second clamping components. This movement causes the parts of the first and second clamping components located in the first limiting groove to move closer or farther apart, allowing the extending parts of the clamping parts to rotate or reset relative to the mounting base. Convenient and quick clamping or releasing of the housing component is achieved. This facilitates the rapid installation of the disassembly and assembly component and the housing component, enhancing the convenience of attaching photography accessories and increasing the functionality of electronic devices.

In the electronic device kit using the disassembly and assembly component in the above embodiments, configuring the disassembly and assembly component and the housing component allows the housing component to accommodate electronic devices. As the disassembly and assembly component enables the installation of photography accessories, the rapid installation of electronic devices and photography accessories is facilitated, increasing the convenience of photography and the functionality of electronic devices.

Figure 1:
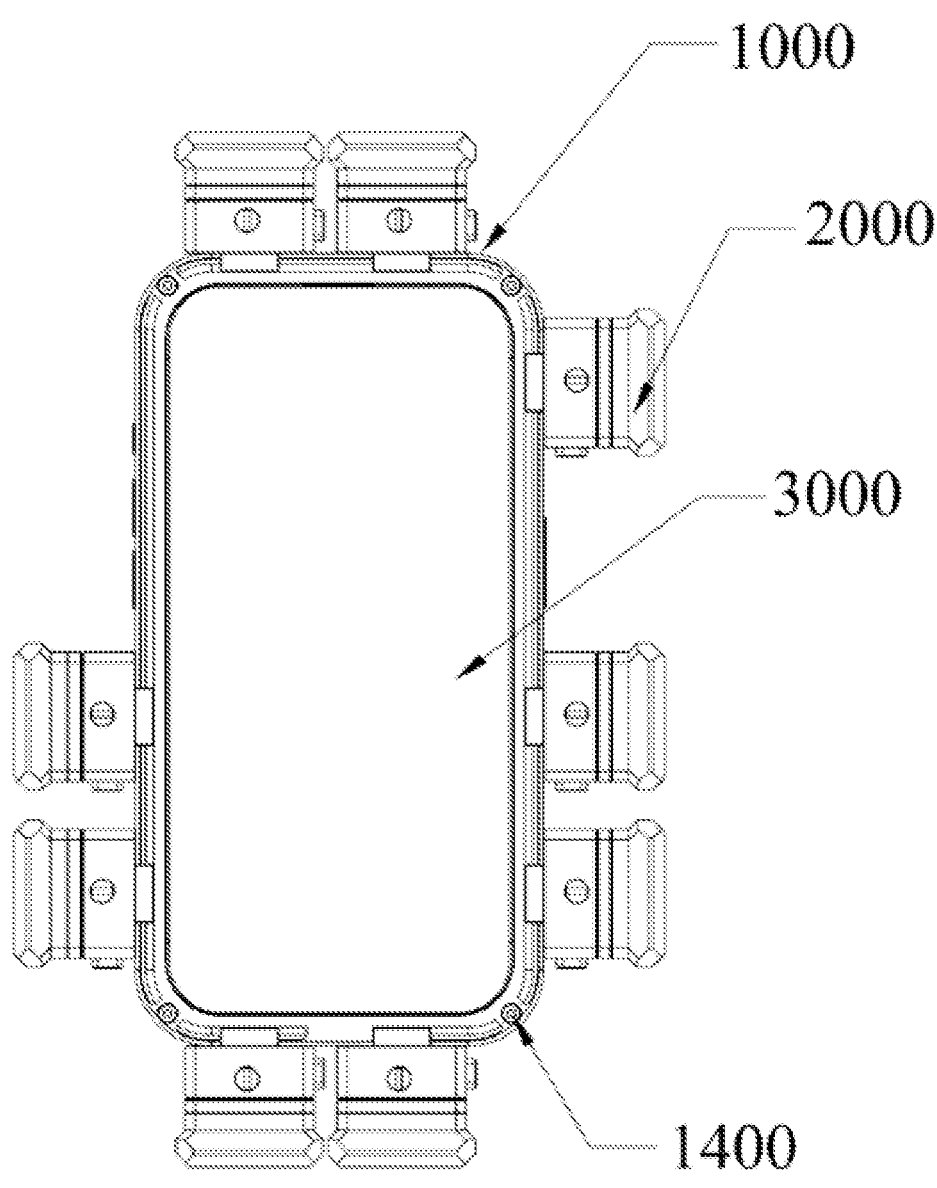
FIG. 1 is a front view of a configuration of an electronic device kit equipped with a disassembly and assembly component in one embodiment.

Wherein: 1000, housing component; 1100, containment cavity; 1200, first shell; 1210, first through hole; 1300, second shell; 1310, second through hole; 1320, mounting part; 1321, mounting groove; 1330, buffer layer; 1331, first limiting component; 1340, second limiting component; 1350, mounting interface; 1360, electronic contact point; 1370, locating hole; 1400, threaded connector; 1500, control module;

2000, disassembly and assembly component; 2100, mounting base; 2110, first limiting groove; 2120, second limiting groove; 2130, first sidewall; 2140, second sidewall; 2150, third sidewall; 2160, fourth sidewall; 2170, first mounting base; 2180, second mounting base; 2181, mounting screw hole; 2200, clamping component; 2210, first clamping component; 2211, third clamping component; 2220, second clamping component; 2221, fourth clamping component; 2230, active space; 2240, clamping cavity; 2300, trigger; 2310, first abutment; 2320, second abutment; 2330, limiting hole; 2410, first resilient element; 2420, second resilient element; 2500, elastic body; 2600, first positioning pillar; 2700, second positioning pillar; 2800, limiting pillar; 2810, mounting hole;

3000, mobile phone;

4000, magnetic component.

DETAILED DESCRIPTION

The following detailed description is made in conjunction with the accompanying drawings to further illustrate the present application. Similar components in different embodiments are denoted by similar reference numerals. In the following embodiments, many details are described for a better understanding of the present application. However, those skilled in the art will readily recognize that some features may be omitted in different situations or replaced by other components, materials, or methods. In some cases, certain operations related to the present application are not shown or described in the specification to avoid overwhelming the essence of the present application with excessive details. For those skilled in the art, detailed descriptions of these operations are not necessary, and they can be fully understood based on the description in the specification and general technical knowledge in this field.

Additionally, features, operations, or characteristics described in the specification may be combined in any suitable manner into various embodiments, and the operational steps involved in each embodiment may be rearranged or adjusted in a manner readily apparent to those skilled in the art. Therefore, the specification and drawings are only intended to describe one embodiment clearly and do not imply the necessary composition and/or sequence.

In this specification, the serial numbers assigned to components themselves, such as "first", "second", etc., are used only to distinguish the described objects and do not have any order or technical significance. The terms "connection" and "linking", unless otherwise specified, include both direct and indirect connections (links).

Currently available electronic devices on the market have increasingly optimized photographic functions. However, these devices typically meet only the general shooting needs of users, and their capabilities are relatively limited. When users want to use additional accessories, such as lights, microphones, it becomes challenging to fulfill more diverse photography requirements and/or applications. The protective shell of electronic devices is commonly used to enhance aesthetics and comfort, as well as to protect the device. The present disclosure provide apparatuses and techniques that creatively utilize the shell by incorporating a novel structural design that allows for the installation of multiple photographic accessories. The design can integrate photographic accessories and electronic devices through disassembly and assembly components, enhancing the convenience of photography with electronic devices.

The term "electronic device" as used in this disclosure can include mobile phones, tablet computers, or other electronic devices with accessory attachment needs. To make the description clearer and more convenient, the mobile phone and the mobile phone shell on it will be described in detail below as examples.

Figure 2:
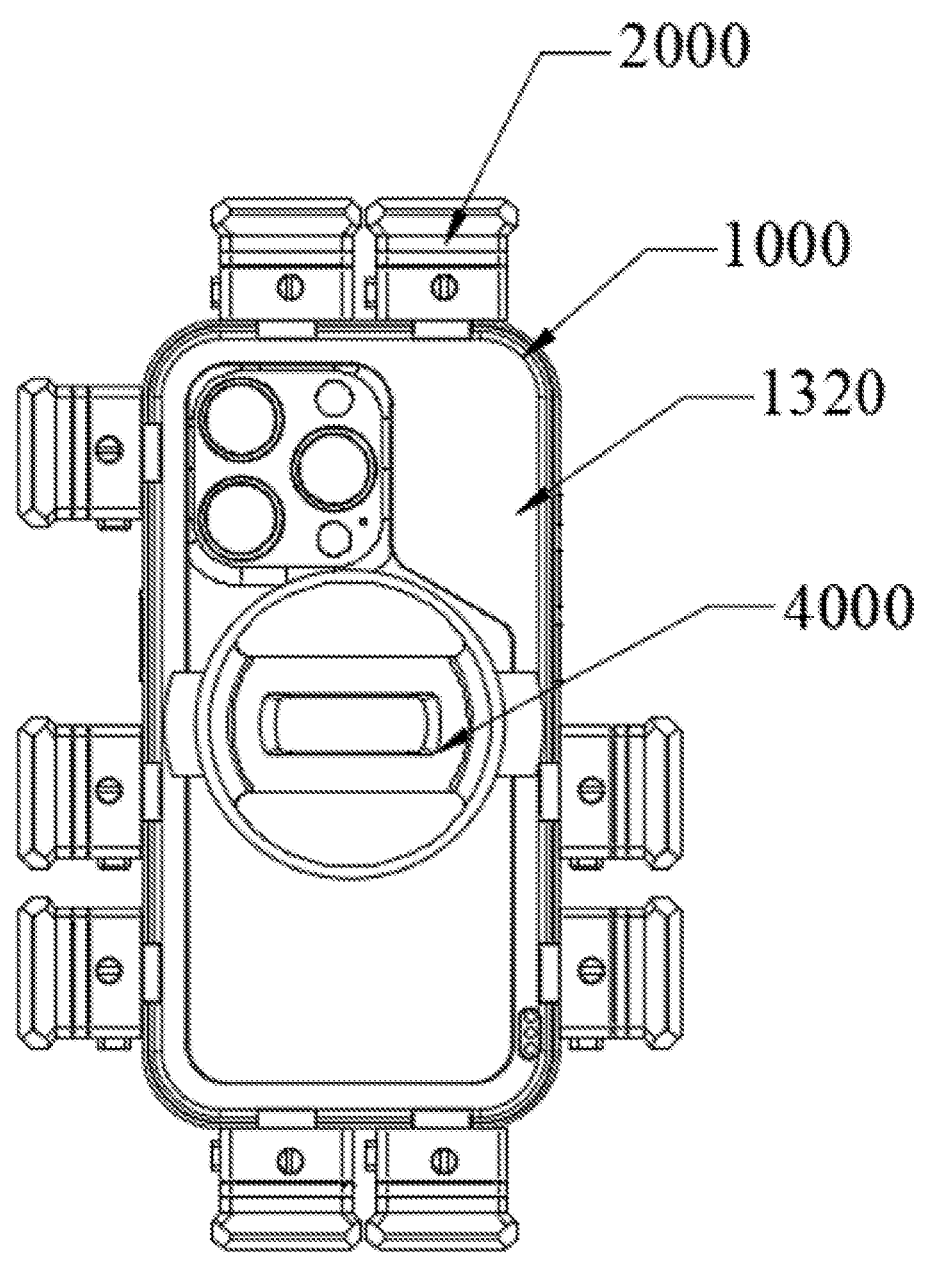
FIG. 2 is a rear view of a configuration of an electronic device kit equipped with the disassembly and assembly component in one embodiment.
Figure 3:
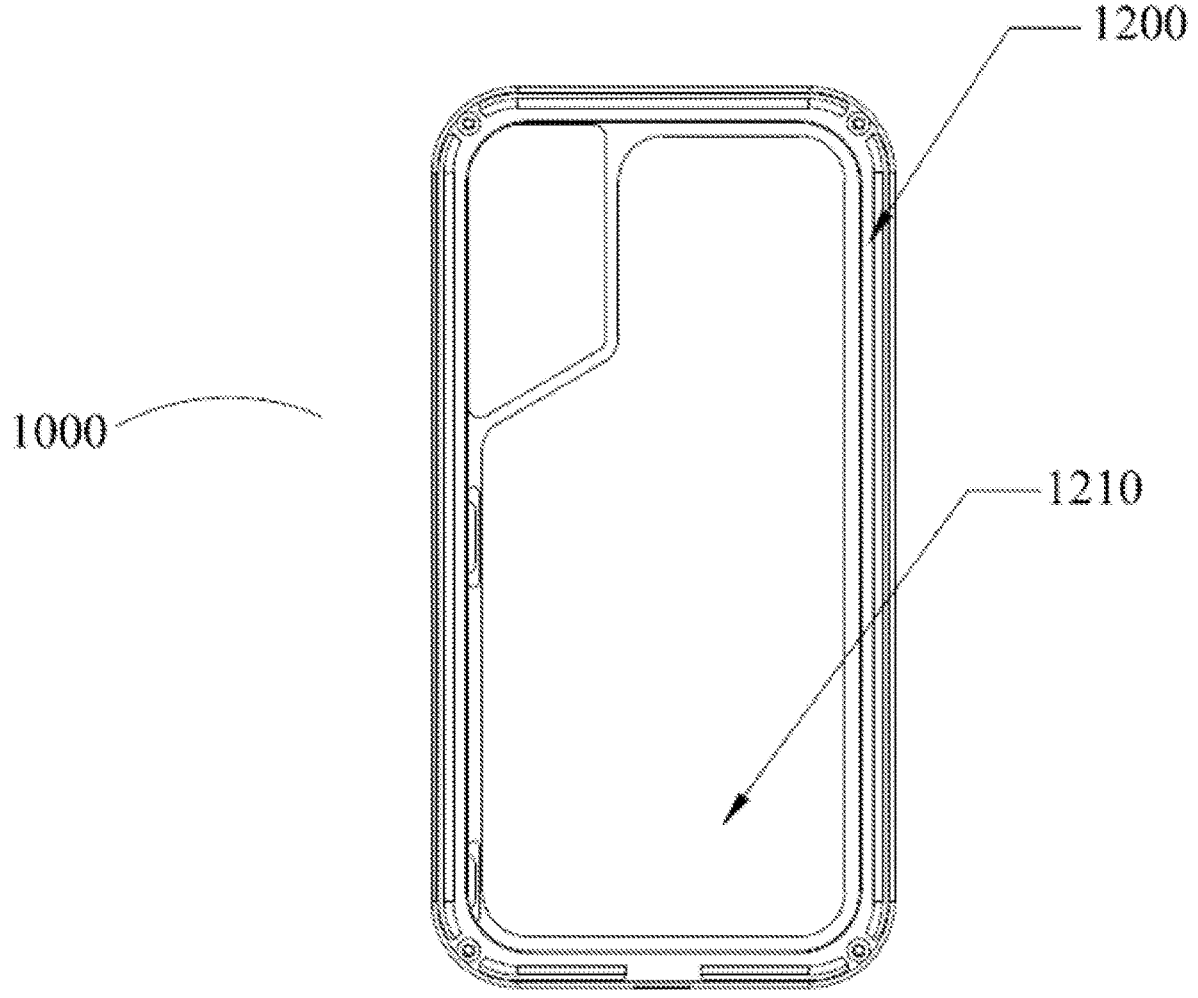
FIG. 3 is a front view of a configuration of a housing component in one embodiment.
Figure 4:
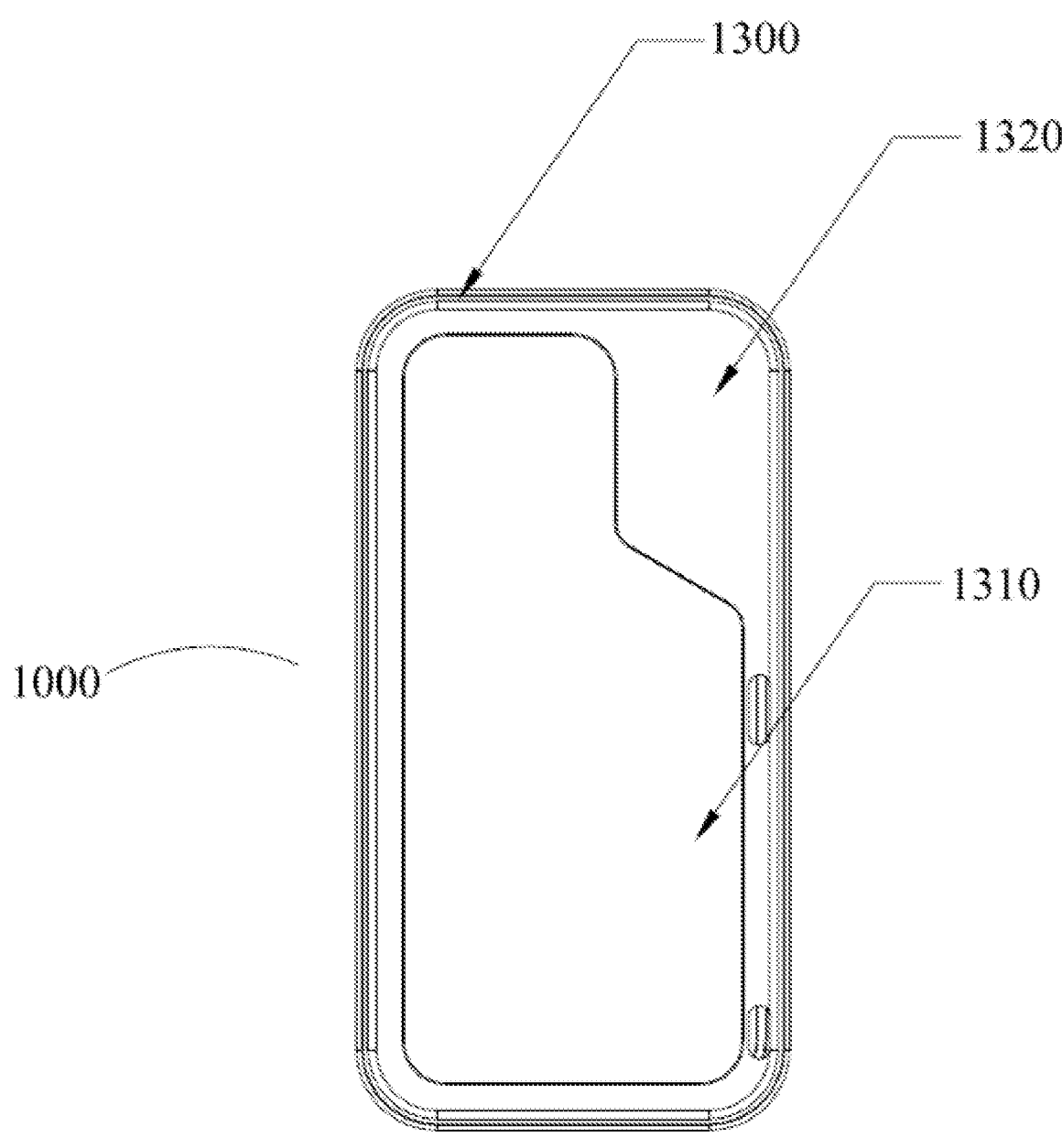
FIG. 4 is a rear view of a configuration of a housing component in one embodiment.
Figure 5:
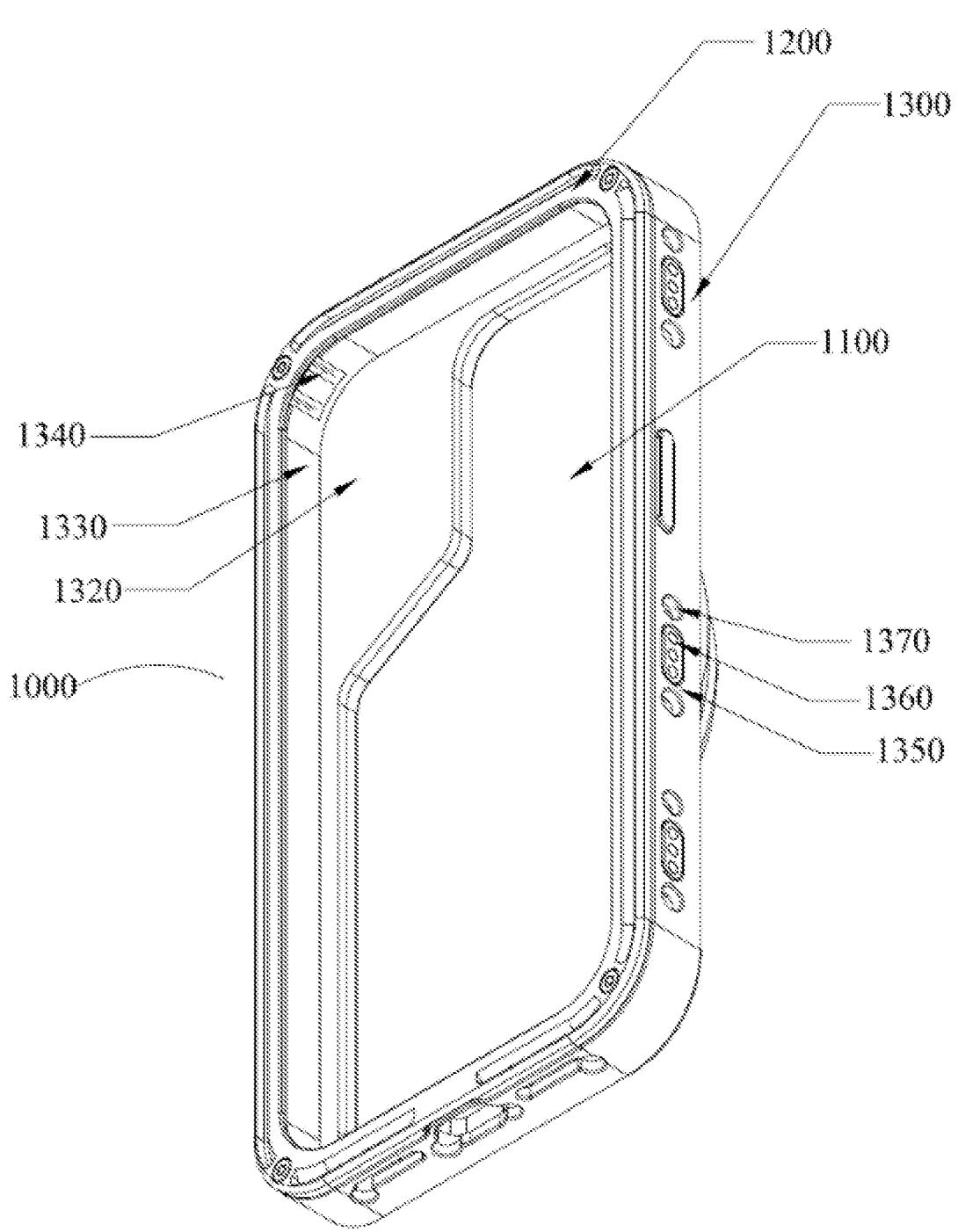
FIG. 5 is a perspective view of a configuration of a housing component in one embodiment.
Figure 6:
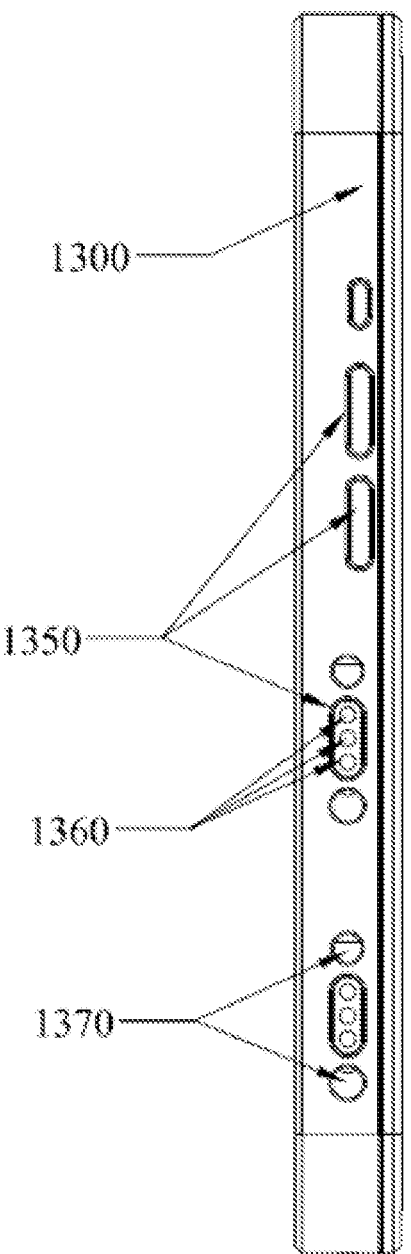
FIG. 6 is a side view of a configuration of a housing component in one embodiment.
Figure 7:
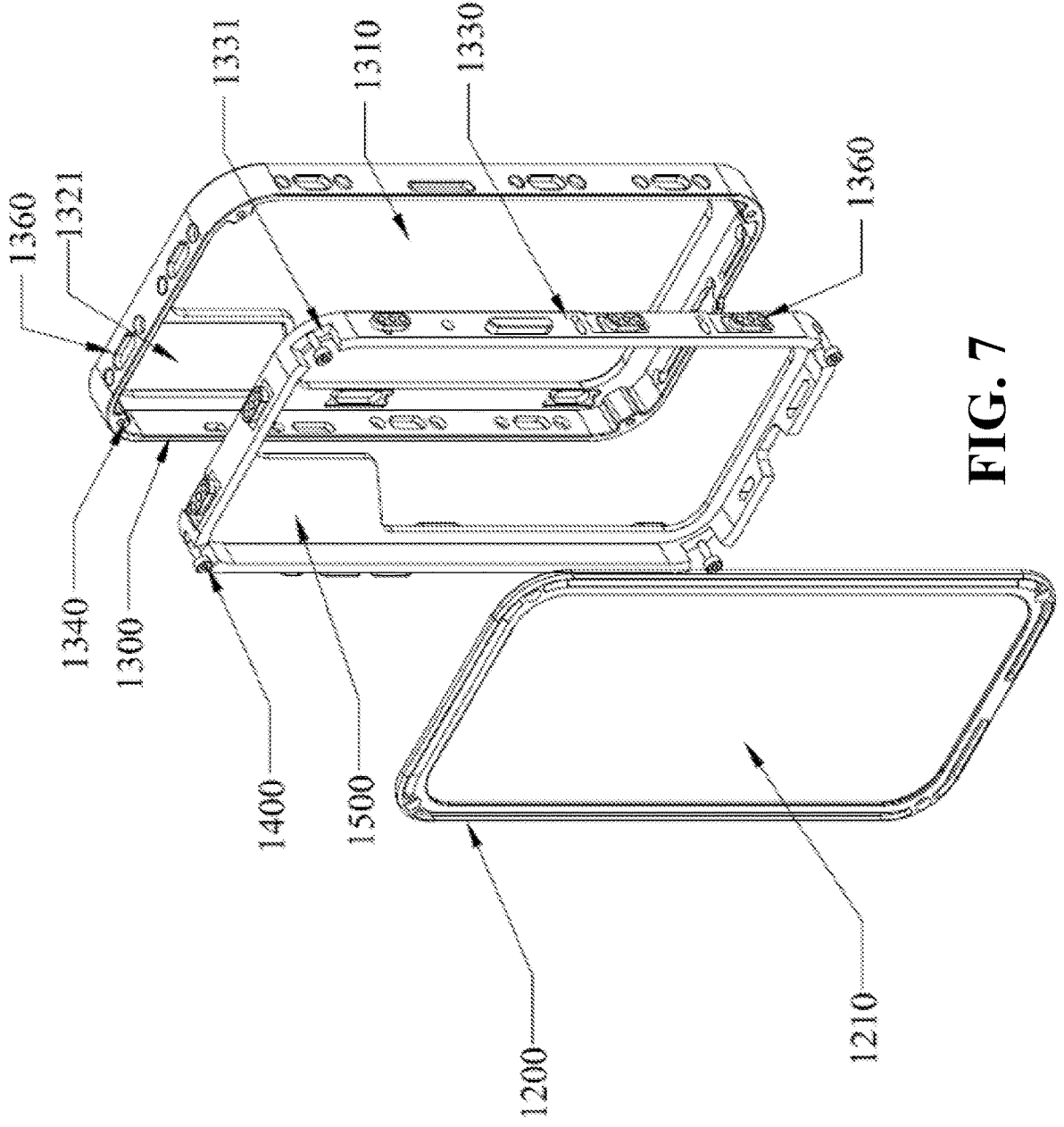
FIG. 7 is an exploded view of a configuration of a housing component in one embodiment.
Figure 8:
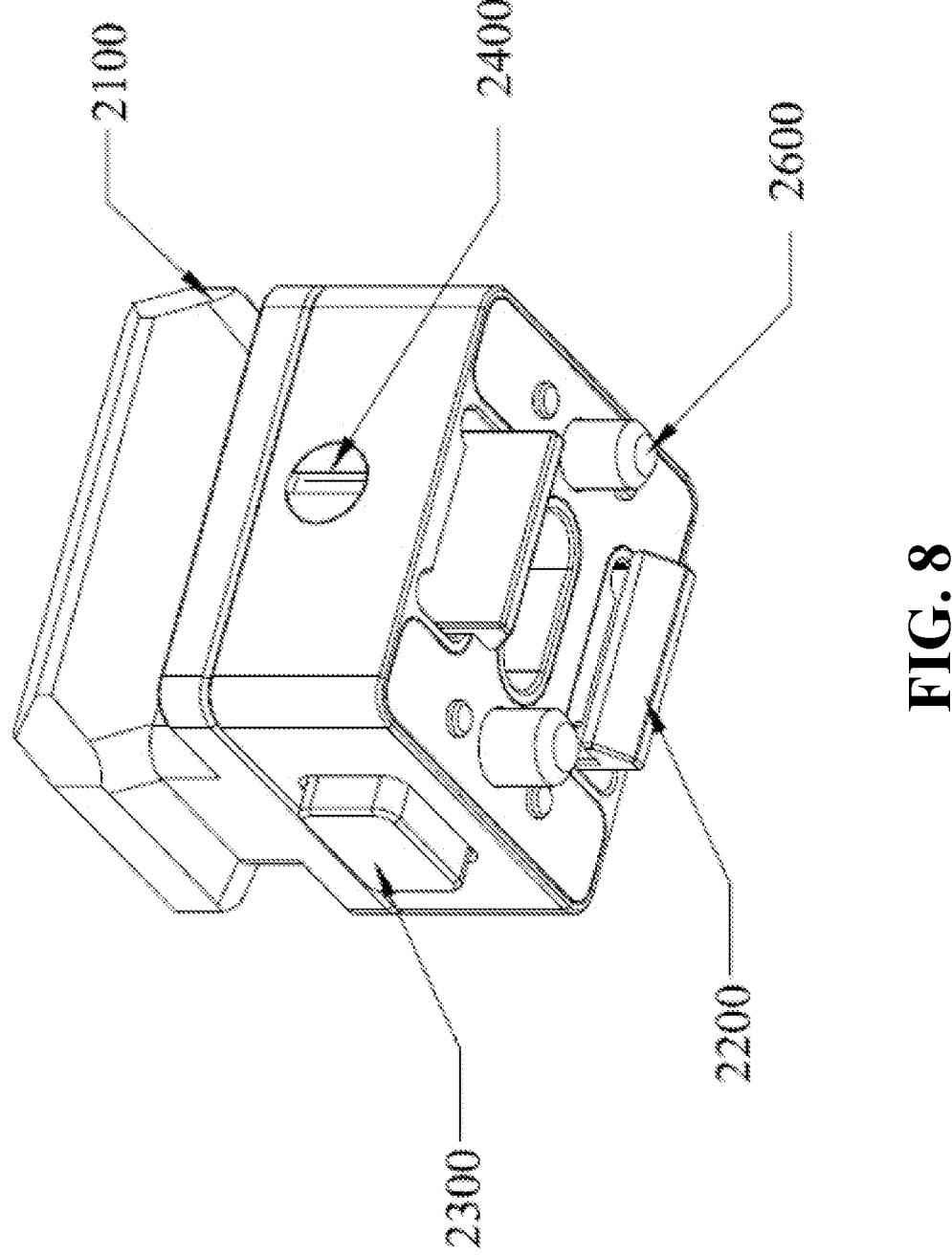
FIG. 8 is a schematic diagram of a configuration of a disassembly and assembly component in one embodiment.
Figure 9:
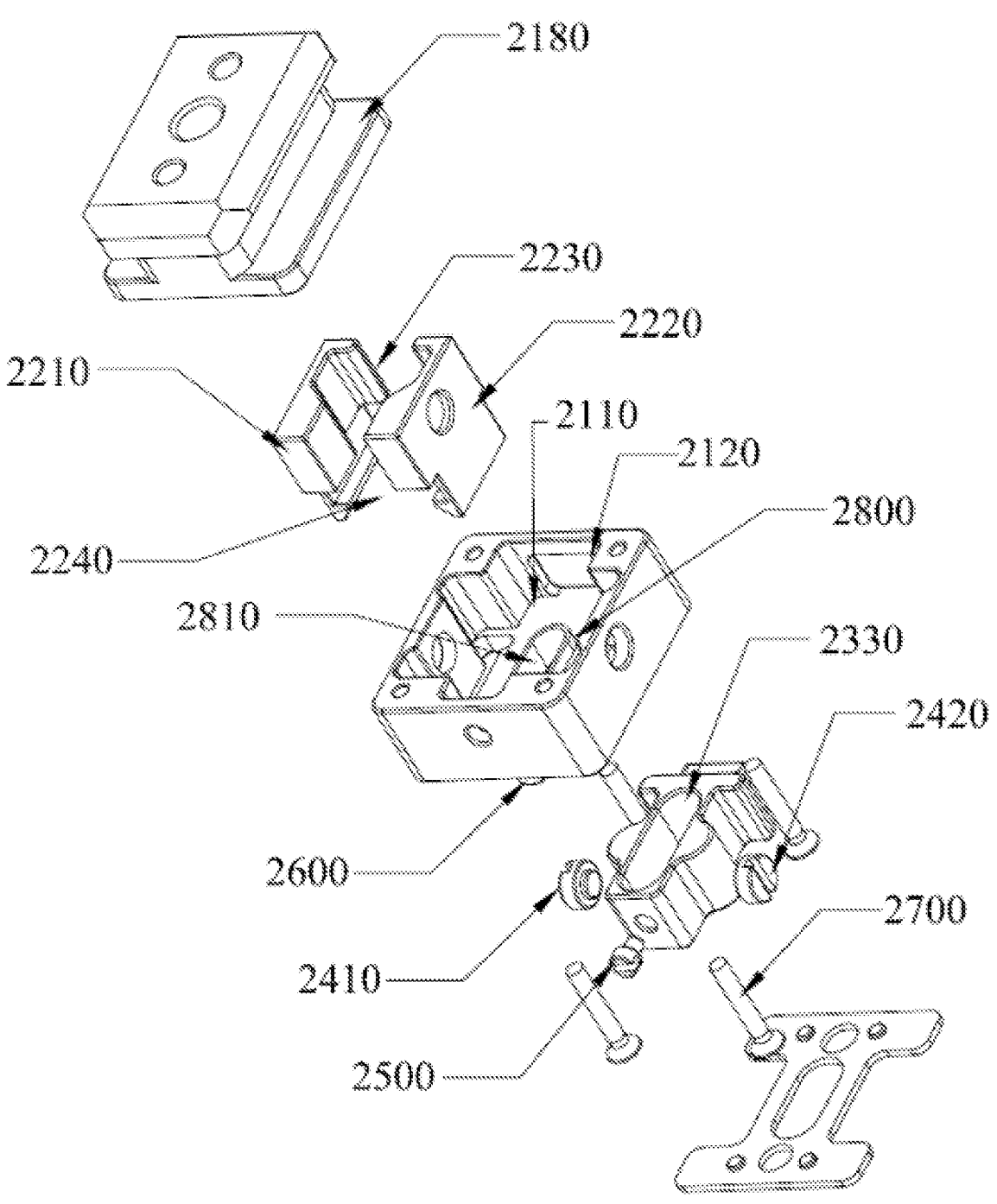
FIG. 9 is an exploded view of a configuration of a disassembly and assembly component in one embodiment.
Figure 10:
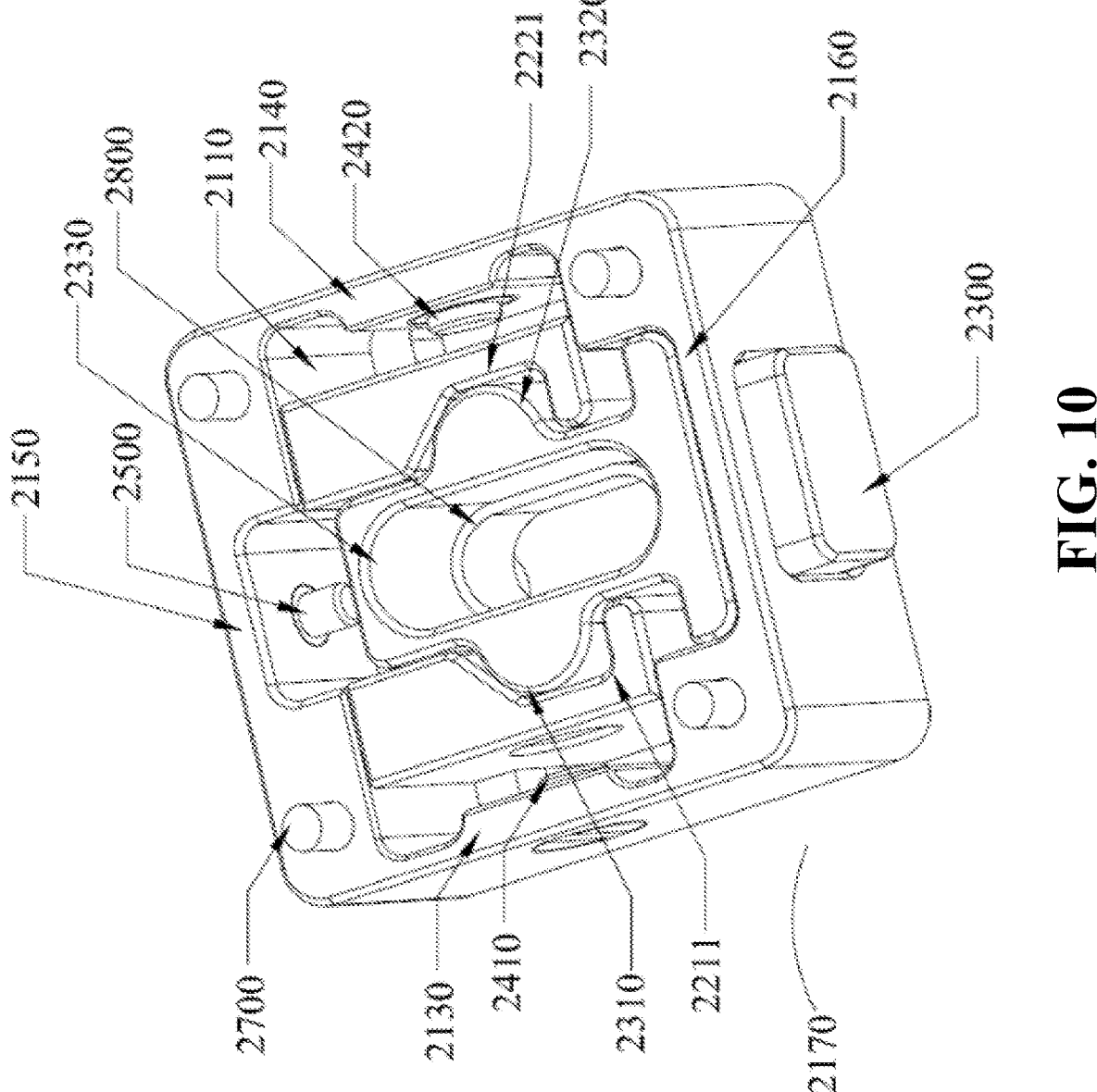
FIG. 10 is a schematic diagram of a configuration of a first mounting base in one embodiment.
Figure 11:
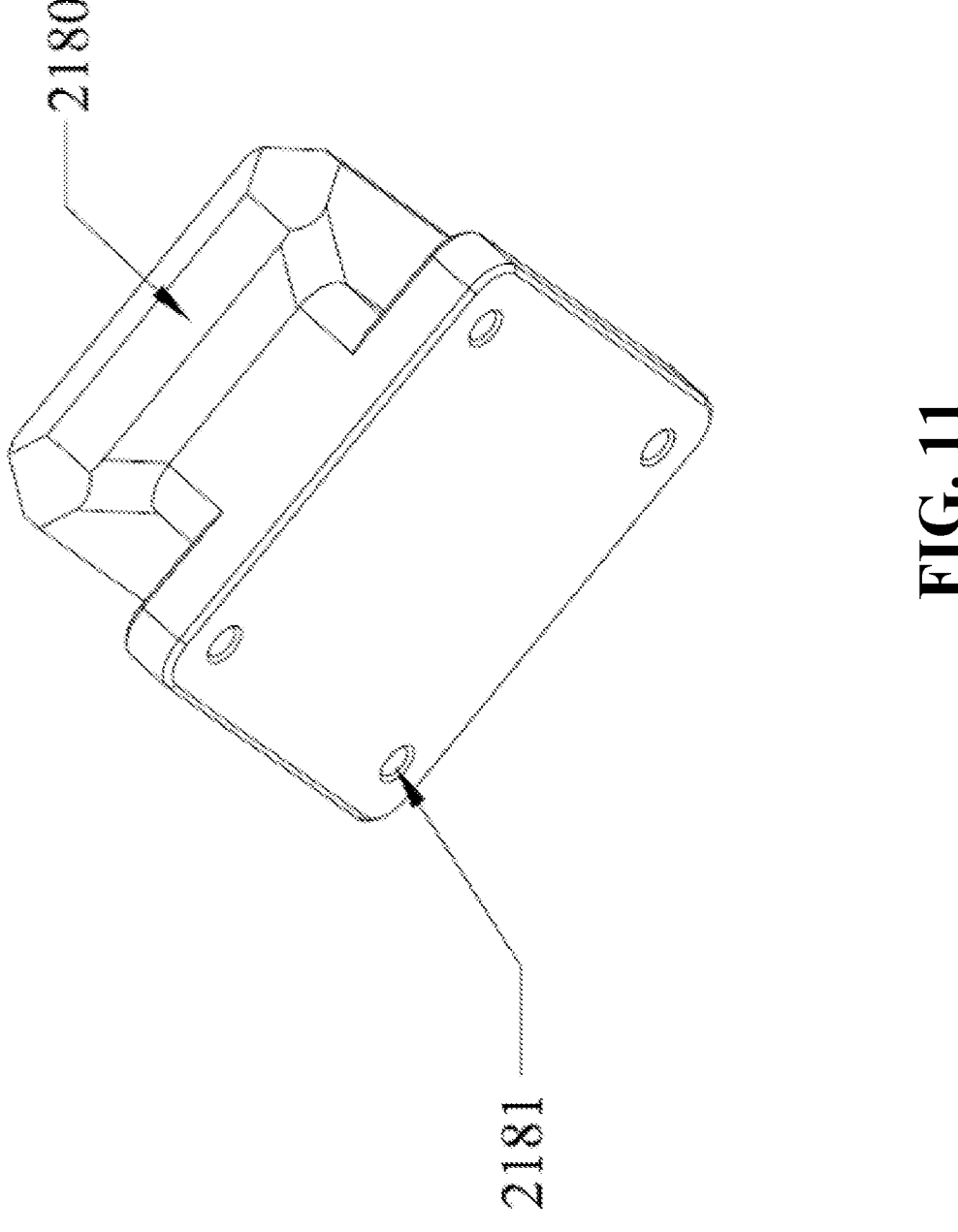
FIG. 11 is a schematic diagram of a configuration of a second mounting base in one embodiment.

Referring to FIGS. 1-11, the present application provides an electronic device kit applying the disassembly and assembly component, including a housing component 1000 and a disassembly and assembly component 2000. The housing component 1000 has a containment cavity 1100, which is used to accommodate an electronic device (such as the phone 3000). The disassembly and assembly component 2000 is arranged on the housing component 1000 to install photography accessories (not shown in the drawings).

By providing the basic function of accommodating and placing electronic devices 3000 with the housing component 1000 and setting the disassembly and assembly component 2000 on it, the foundation for installing photography accessories is laid, enabling the photography accessories to be connected to the disassembly and assembly component 2000 as an integral structure, improving the convenience of photography.

Referring to FIGS. 1-7, the housing component 1000 includes a first shell 1200 and a second shell 1300. The first shell 1200 is provided with a first through hole 1210, which is used to expose the display screen of the electronic device 3000. The first shell 1200 and the second shell 1300 together form the containment cavity 1100. The second shell 1300 is provided with a second through hole 1310, which corresponds in position to the first through hole 1210. The second through hole 1310 is used to expose the side of the electronic device 3000 opposite to the display screen. An installation part 1320 is provided inside the second through hole 1310 and is integrally connected to the second shell 1300 to restrict the electronic device 3000. A buffer layer 1330 is provided on the side of the second shell 1300 facing the containment cavity 1100, and the buffer layer 1330 is connected to the installation part 1320 and can play a buffering role, ensuring that the electronic device 3000 is firmly installed. The buffer layer 1330 is provided with a first limiting component 1331, and the second shell 1300, facing the containment cavity 1100, is also provided with a second limiting component 1340. The second limiting component 1340 engages with the first limiting component 1331 to limit and fix the buffer layer 1330.

Furthermore, the first limiting component 1331 and the second limiting component 1340 may be projections and recesses, or recesses and projections, respectively, and these two complement each other structurally for the fixed positioning of the buffer layer 1330.

Furthermore, for the convenience of fixing the electronic device 3000, the first shell 1200 and the second shell 1300 can be detachably connected. The first shell 1200 and the second shell 1300 can be detachably connected by a snap-fit or screw-fit method.

Preferably, in one embodiment, the first shell 1200 and the second shell 1300 are connected by a threaded connector 1400 (which can be a connecting screw or bolt). When in use, the threaded connector 1400 is disassembled, the first shell 1200 and the second shell 1300 are separated, and the phone 3000 is placed in contact with the installation part 1320 on the side opposite to the display screen. The phone 3000 is installed without affecting its functionality. Then, the second shell 1300 is connected to the first shell 1200 through the threaded connector 1400 for the fixed positioning of the phone 3000.

In a specific and illustrative embodiment, to further enhance the functionality of the housing component 1000 and facilitate the use of photographic accessories, it also includes a control module 1500 and a cable (not shown in the drawings). The control module 1500 and the cable are arranged in the containment cavity 1100, and at least one installation interface 1350 is provided on the side wall of the housing component 1000. At least one installation interface 1350 is provided with an electronic contact 1360, and the two ends of the cable are respectively connected to the electronic contact 1360 and the control module 1500. The disassembly and assembly component 2000, positioned adjacent to one side of the housing component 1000, features electronic contact pins that establish contact with the electronic contact points 1360, ensuring effective circuit conductivity.

Furthermore, when a photographic accessory necessitates power supply or information transmission sharing, it is equipped with conductive pins. The conductive pins connect to the electronic contact point 1360 electronically via the electronic contact pin on the disassembly and assembly component 2000 to enable circuit connection for the photographic accessory powering and/or information transmission.

Furthermore, the electronic contact 1360 is arranged on the side of the buffer layer 1330 near the second shell 1300, allowing it to pass through the installation interface 1350 and contact the disassembly and assembly component 2000.

Specifically, the control module 1500 includes a power supply control module and/or a data processing control module. By setting the power supply control module, the electronic device shell becomes a power bank, capable of charging external photographic accessories. Based on proper setting, the data processing control module can be connected to the circuit of the phone 3000, enabling data transfer from the photographic accessory to the electronic device for information sharing.

Furthermore, not all installation interfaces 1350 are provided with electronic contacts 1360. The position where the disassembly and assembly component 2000 is not provided with electronic contacts 1360 may be only for connecting the housing component 1000 and the photographic accessory, and electronic contacts 1360 can be provided as needed. The position where the electronic contact 1360 is arranged can enable power supply or information sharing through circuit connection.

In a specific and illustrative embodiment, the control module 1500 is arranged in the installation part 1320, and the cable is arranged on the buffer layer 1330 and passes through it to connect to the electronic contact 1360 electrically. Alternatively, the cable is set between the buffer layer 1330 and the second shell 1300, with one end connected to the electronic contact 1360 and the other end connected to the control module 1500 electrically.

Furthermore, the installation part 1320 is provided with an installation groove 1321, where the control module 1500 is located.

In one embodiment, the disassembly and assembly component 2000 can be integrated with the housing component 1000.

Of course, in other embodiments, the disassembly and assembly component 2000 can also be detachably connected to the housing component 1000 for easier storage and use.

Referring to FIGS. 8-11, the disassembly and assembly component 2000 comprises a mounting base 2100 equipped with a first limiting groove 2110 and a second limiting groove 2120, clamping components 2200, and a trigger 2300. The second limiting groove 2120 is positioned longitudinally through the sidewall of the mounting base 2100, establishing a connection with the first limiting groove 2110. The clamping components 2200 encompass a mutually arranged first clamping component 2210 and a second clamping component 2220. Both components resiliently inhabit the confines of the first limiting groove 2110, extending from the mounting base 2100 with one end. The opposing faces of the first and second clamping components 2210 and 2220 within the first limiting groove 2120 delineate an active space 2230. The trigger 2300, positioned with one end residing within the second limiting groove 2120, extending into the first limiting groove 2110. It can reciprocate along the axis of the second limiting groove 2120 within the active space 2230. During movement in the first direction within the active space 2230, the trigger 2300 induces separation between one end of the first and second clamping components 2210 and 2220 within the first limiting groove, instigating relative motion between the protruding ends of the first and second clamping components 2210 and 2220 in relation to the mounting base 2100. In contrast, when the trigger 2300 moves in the second direction within the active space 2230, the first and second clamping components 2210 and 2220 can reset in relation to the mounting base 2100. The first direction and the second direction are opposite.

It is noteworthy that the directional terms, "first direction" and "second direction," are not rigidly fixed; their orientation can vary depending on the observer's perspective. For example, when observing the trigger component 2300 from the front view, the first and second directions align with the front and back directions. Conversely, a 90° rotation alters the orientation, aligning the first and second directions with the left and right directions.

The resilient configuration, as mentioned above, can be realized through the utilization of elastic materials for the first clamping component 2210, the second clamping component 2220, and the trigger 2300, allowing them to reset autonomously under their inherent elastic restoring force. Alternatively, external elastic elements 2400 can contribute to achieving the desired resilient characteristics.

In the first embodiment, the opposing surfaces of the protruding first clamping component 2210 and second clamping component 2220, collectively forming a clamping cavity 2240, expand synchronously with the motion of the trigger 2300 along the first direction. This movement results in an enlarged active space 2230 and an expanded clamping cavity 2240, facilitating the release of the housing component 1000. Conversely, when the trigger 2300 moves along the second direction, guided by the influence of elastic restoring force, the first clamping component 2210 and the second clamping component 2220 draw closer, concurrently reducing both the active space 2230 and clamping cavity 2240. The clamping cavity 2240 is strategically designed to ensure a secure grip on objects.

Specifically, during the installation of the disassembly and assembly component 2000, force is applied to the trigger 2300, prompting movement along the axis of the second limiting groove 2120 within the active space 2230. As the trigger 2300 enters the active space 2230, its expanded volume exerts force on the first clamping component 2210 and the second clamping component 2220, causing them to separate and enlarge the clamping cavity 2240. This positioning allows the first clamping component 2210 and the second clamping component 2220 to be situated on opposite sides of the housing component 1000. Upon the reversal of the trigger 2300's movement, the force responsible for separating the first clamping component 2210 and the second clamping component 2220 is counteracted as the volume of the trigger 2300 in the active space 2230 decreases. Simultaneously, under the influence of the elastic restoring force from the elastic element 2400, the first clamping component 2210 and the second clamping component 2220 draw closer, reducing the clamping cavity 2240 and causing the two clamping components to clamp the housing component 1000. This mechanism ensures a swift and secure installation process.

In the second embodiment, the midsection of both the first clamping component 2210 and the second clamping component 2220 is hinged, with the opposing surfaces of the protruding components forming a clamping cavity 2240. The trigger 2300, when moving along the first direction, increases the active space 2230 and decreases the clamping cavity 2240, effectively securing the housing component 1000. Conversely, movement along the second direction reduces the active space 2230 and increases the clamping cavity 2240, facilitating the release of the housing component 1000.

In the third embodiment, the end of the first clamping component 2210 and the second clamping component 2220 protruding from the mounting base 2100, are connected to the housing component 1000 through a snap-lock mechanism. Snap-fit holes on the housing component 1000 facilitate secure engagement with the first clamping component 2210 and the second clamping component 2220. This configuration allows for the arrangement of the first clamping component 2210 and the second clamping component 2220 using the layout methods described in either the first or second embodiment.

In a specific and illustrative embodiment, the mounting base 2100 comprises first, second, third, and fourth sidewalls, namely 2130, 2140, 2150, and 2160, respectively. The first and second sidewalls 2130 and 2140 are arranged opposite each other, as are the third and fourth sidewalls 2150 and 2160. Collectively, these sidewalls enclose to form at least a portion of the first limiting groove 2110, while the second limiting groove 2120 is positioned through the fourth sidewall 2160. A first resilient element 2410 is positioned between the first sidewall 2130 and the first clamping component 2210, and a second resilient element 2420 is positioned between the second sidewall 2140 and the second clamping component 2220. As the trigger 2300 moves along the axis of the second limiting groove 2120 towards the third sidewall 2150 (the first direction), it propels motion of the first and second clamping components 2210 and 2220 in relation to the mounting base 2100. Conversely, when the trigger 2300 moves away from the third sidewall 2150 (the second direction) along the axis of the second limiting groove 2120, the elastic restoring force of the first and second resilient elements 2410 and 2420 prompts the reset of the first and second clamping components in relation to the mounting base 2100.

It is essential to note that the combined presence of the first sidewall 2130, the second sidewall 2140, the third sidewall 2150, and the fourth sidewall 2160 collectively constitutes at least a portion of the first limiting groove 2110. This encompasses scenarios where these sidewalls form the entire first limiting groove 2110 or contribute to only a segment of it.

In an alternate embodiment, the positions of the first elastic element 2410 and the second elastic element 2420 can be adjusted based on specific requirements, including the option to place them between the first clamping component 2210 and the second clamping component 2220.

In a specific and illustrative embodiment, external force applied to the trigger 2300 prompts its movement along the axis of the second limiting groove 2120 towards the third sidewall 2150. Once the external force is withdrawn, the elastic body 2500, positioned between the third sidewall 2150 and the trigger 2300, utilizes its elastic restoring force to assist the trigger 2300 in rebounding independently in the second direction. Preferably, the elastic restoring force of the elastic body 2500 aligns parallel to the movement direction of the trigger 2300.

In another embodiment, the presence of the elastic body 2500 may be omitted, and a reverse force can be directly applied to the trigger 2300. This results in the trigger 2300 moving away from the third sidewall 2150 (in the second direction) along the axis of the second limiting groove 2120. Consequently, the first clamping component 2210 moves closer under the influence of the first elastic element 2410, and the second clamping component 2220 moves closer under the influence of the second elastic element 2420.

In a specific and illustrative embodiment, the trigger 2300 is furnished with a first abutment 2310 and a second abutment 2320, while corresponding third and fourth abutments 2211 and 2221 are located on the opposing sides of the first clamping component 2210 and the second clamping component 2220. The first abutment 2310 aligns with the third abutment 2211, and the second abutment 2320 aligns with the fourth abutment 2221. When the trigger 2300 approaches the third sidewall 2150, the first abutment 2310 imparts a first force onto the third abutment 2211, prompting the first clamping component 2210 to move towards the first sidewall 2130. Concurrently, the second abutment 2320 exerts a second force onto the fourth abutment 2221, inducing the second clamping component 2220 to move towards the second sidewall 2140. As the trigger 2300 moves away from the third sidewall 2150, the elastic restoring force of the first elastic element 2410 comes into play. The third abutment 2211 then applies a third force to the first abutment 2310, causing the first clamping component 2210 to move away from the first sidewall 2130. Simultaneously, under the influence of the elastic restoring force from the second elastic element 2420, the second abutment 2320 applies a fourth force, leading the second clamping component 2220 to move away from the second sidewall 2140.

In a specific and illustrative embodiment, the first and second abutments 2310 and 2320 can manifest as protruding structures, while the third and fourth abutments 2211 and 2221 adopt corresponding recessed structures, or conversely, the first and second abutments 2310 and 2320 may be recessed structures, while the third and fourth abutments 2211 and 2221 exhibit corresponding protruding structures.

In a specific and illustrative embodiment, the mounting base 2100 encompasses a first mounting base 2170 and a second mounting base 2180. The first and second limiting grooves 2110 and 2120 are situated on the first mounting base 2170. One end of the clamping component 2200 resides within the first limiting groove, with the other end extending beyond the first mounting base 2170. The second mounting base 2180 is affixable in a detachable manner to the first mounting base 2170. Depending on the structure of the photographic accessory or requirements, the photographic accessory can either be mounted onto the second mounting base 2180 or the first mounting base 2170 to facilitate the use of various photographic accessories. If the photographic accessory features a mounting groove, a mounting slider (such as a Manfrotto slider) can be employed on the end of the second mounting base 2180 away from the first mounting base 2170, to connect the photographic accessory to the second mounting base 2180 via the mounting slider and mounting groove.

Furthermore, the central segment of the limiting pillar 2800 is furnished with a mounting hole 2810. This hole accommodates the passage of a conductive pin, allowing it to establish contact with the electronic contact point 1360 on the housing component 1000 after traversing the mounting hole 2810, thereby facilitating electrical conduction.

Certainly, the conductive pin can also be directly connected to and establish contact with the electronic contact point 1360 for the purpose of achieving electrical conduction or information interconnection.

Furthermore, the detachable connection between the first mounting base 2170 and the second mounting base 2180 incorporates both a snap-fit and threaded connection.

In a specific and illustrative embodiment, one end of the first mounting base 2170, distal from the second mounting base 2180, features a first positioning pillar 2600. Correspondingly, on the second shell 1300 of the housing component 1000, there is at least one positioning hole 1370 aligned with the mounting interface 1350. The first positioning pillar 2600 connects with the positioning hole 1370, facilitating rapid positioning and installation of the disassembly and assembly component 2000. The end of first mounting base 2170, proximate to the second mounting base 2180, is movably equipped with a second positioning pillar 2700. The connection between the first mounting base 2170 and the second mounting base 2180 is established through the second positioning pillar 2700, enabling the detachable connection. The end of the second positioning pillar 2700 near the second mounting base 2180 is threaded, and corresponding mounting screw holes 2181 are provided on the second mounting base 2180.

Furthermore, the second positioning pillar 2700 can take the form of a bolt, passing through both the first mounting base 2170 and the second mounting base 2180 to form a secure connection.

It is important to note that the term "at least one" indicates flexibility in quantity, such as 1, 2, etc. The shape of the positioning hole 1370 can include circular and elliptical forms, aligning with the structure of the first positioning pillar 2600.

In a specific and illustrative embodiment, the first limiting groove 2110 is furnished with a limiting pillar 2800, and the trigger 2300 possesses a limiting hole 2330 at its center. The limiting pillar 2800 is mobile or movable within the limiting hole 2330, providing a defined movement track for the trigger 2300 along the sidewall of the pillar and constraining its trajectory.

In another specific and illustrative embodiment, the side of the second shell 1300, opposite the first shell 1200, incorporates a magnetic component 4000. This component can be utilized to connect the shell with a radiator or other functional accessories.

The above examples are presented to illustrate the disclosure, serving only to facilitate an understanding of the disclosure, and should not be employed to limit the disclosure. For those skilled in the relevant technical field, various straightforward deductions, modifications, or substitutions can still be made based on the concept of the disclosure.

What is claimed is:

1. A disassembly and assembly component, comprising:
    a mounting base equipped with a first limiting groove and a second limiting groove; the second limiting groove being positioned through a sidewall of the mounting base, establishing a connection with the first limiting groove;
    a clamping component comprising a first clamping component and a second clamping component arranged opposite to each other; with the first clamping component and the second clamping component being movably arrange within the first limiting groove, and a first end of the first clamping component and a first end of the second clamping component respectively extend from the mounting base; an active space formed between opposing surfaces of the first clamping component and the second clamping component within the first limiting groove; and
    a trigger, a first end of the trigger being arranged within the second limiting groove, and a second end of the trigger extending towards the first limiting groove; the trigger being configured to reciprocate along an axis of the second limiting groove within the active space;
    the trigger being configured to move in a first direction within the active space to drive the first clamping component and the second clamping component to move away from each other within the first limiting groove, instigating relative motion between a protruding end of the first clamping component and a protruding end of the second clamping components relative to the mounting base;
    the trigger being configured to move in a second direction within the active space, to reset the first clamping component and the second clamping component in relation to the mounting base;
    wherein, the first direction and the second direction are opposite.

2. The disassembly and assembly component according to claim 1, wherein the mounting base comprises a first sidewall, a second sidewall, a third sidewall, and a fourth sidewall; the first sidewall and the second sidewall are arranged opposite to each other, the third sidewall and the fourth sidewall are arranged opposite to each other; the first sidewall, the second sidewall, the third sidewall, and the fourth sidewall enclose at least a portion of the first limiting groove, the second limiting groove is positioned through the fourth sidewall;
    a first resilient element is positioned between the first sidewall and the first clamping component, and a second resilient element is positioned between the second sidewall and the second clamping component;
    the trigger is configured to move along the axis of the second limiting groove towards the third sidewall, to drive relative motion of the first clamping components and the second clamping component in relation to the mounting base;
    the trigger is configured to move away from the third sidewall along the axis of the second limiting groove, to use an elastic restoring force of the first resilient element and the second resilient element to reset the first clamping component and the second clamping component in relation to the mounting base.

3. The disassembly and assembly component according to claim 2, further comprising an elastic body, the elastic body being arranged between the third sidewall and the trigger.

4. The disassembly and assembly component according to claim 3, wherein the trigger comprises a first abutment and a second abutment, corresponding to a third abutment and a fourth abutment respectively located on opposing sides of the first clamping component and the second clamping component;
    the first abutment aligns with the third abutment, and the second abutment aligns with the fourth abutment.

5. The disassembly and assembly component according to claim 2, wherein the trigger comprises a first abutment and a second abutment, corresponding a third abutment and a fourth abutment respectively located on opposing sides of the first clamping component and the second clamping component;
    the first abutment aligns with the third abutment, and the second abutment aligns with the fourth abutment.

6. The disassembly and assembly component according to claim 4, wherein the first abutment and the second abutment are arranged as a protruding structure, while the third abutment and the fourth abutment are arranged as a recessed structure corresponding to the protruding structure.

7. The disassembly and assembly component according to claim 4, wherein the first abutment and the second abutment are arranged as a recessed structure, while the third abutment and the fourth abutment are arranged as a protruding structure corresponding to the recessed structure.

8. The disassembly and assembly component according to claim 1, wherein the mounting base comprises a first mounting base and a second mounting base;
    the first limiting groove and the second limiting grooves are on the first mounting base;
    a first end of the first clamping component and a first end of the second clamping component reside within the first limiting groove, and a second end of the first clamping component and a first end of the second clamping component are arranged to extend beyond the first mounting base; and
    the second mounting base is affixable in a detachable manner to the first mounting base.

9. The disassembly and assembly component according to claim 1, further comprising a limiting pillar within the first limiting groove, and a limiting hole being positioned centrally within the trigger;
    the limiting pillar is movably arranged within the limiting hole, and enabling the trigger to move along a sidewall of the limiting pillar.

10. The disassembly and assembly component according to claim 1, wherein the mounting base comprises a first side and a second side that is opposite to the first side;
    the first clamping component and the second clamping component partially protrude from the second side, which is equipped with a first positioning pillar.

11. An electronic device kit, comprising:
    a housing component featuring a containment cavity designed to house an electronic device; and a plurality of disassembly and assembly components as described in claim 1, the disassembly and assembly components being detachably positioned on the housing component for mounting a photographic equipment onto the housing component.

12. The electronic device kit according to claim 11, further comprising a control module and a connecting wire are included within the containment cavity;

at least one a mounting interface being provided on sidewall of the housing component, and each mounting interface being equipped with at least one an electronic contact point; two ends of the connecting wire being connected to the electronic contact point and the control module; the disassembly and assembly component, situated adjacent to one side of the housing component, being endowed with an electronic contact pin;

the electronic contact pin being in contact with the electronic contact point, ensuring effective circuit conductivity.

* * * * *